C. W. RICHARDSON, E. & J. E. DAWSON.
Car Brake and Starter.

No. 226,881. Patented April 27, 1880.

Attest:
W. E. Chaffee
Levi Bacon

Inventors
Charles W. Richardson,
Edmund Dawson,
John E. Dawson,
by Heylmun & Kane, attys.

UNITED STATES PATENT OFFICE.

CHARLES W. RICHARDSON, EDMUND DAWSON, AND JOHN E. DAWSON, OF RED BLUFF, CALIFORNIA.

CAR BRAKE AND STARTER.

SPECIFICATION forming part of Letters Patent No. 226,881, dated April 27, 1880.

Application filed September 22, 1879.

*To all whom it may concern:*

Be it known that we, CHARLES W. RICHARDSON, EDMUND DAWSON, and JOHN E. DAWSON, of Red Bluff, in the county of Tehama and State of California, have invented a new and valuable Improvement in Means for Stopping and Starting Street-Cars; and we do hereby declare that the following is a full, clear, and exact description of the construction and operation of the same, reference being had to the annexed drawings, making a part of this specification, and to the letters and figures of reference marked thereon.

Figure 1:
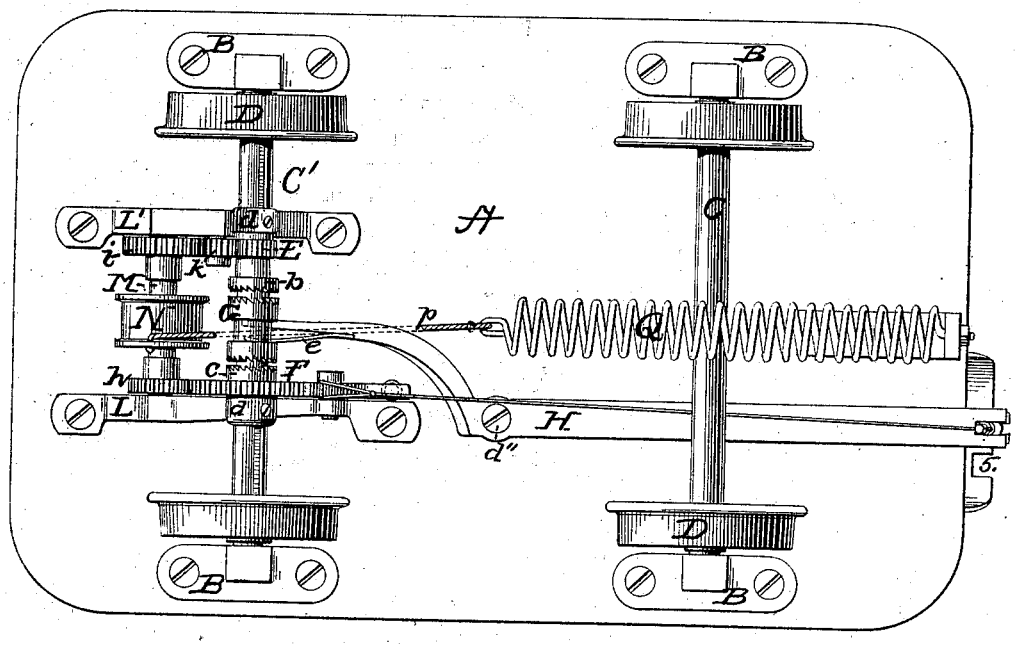
Figure 2:
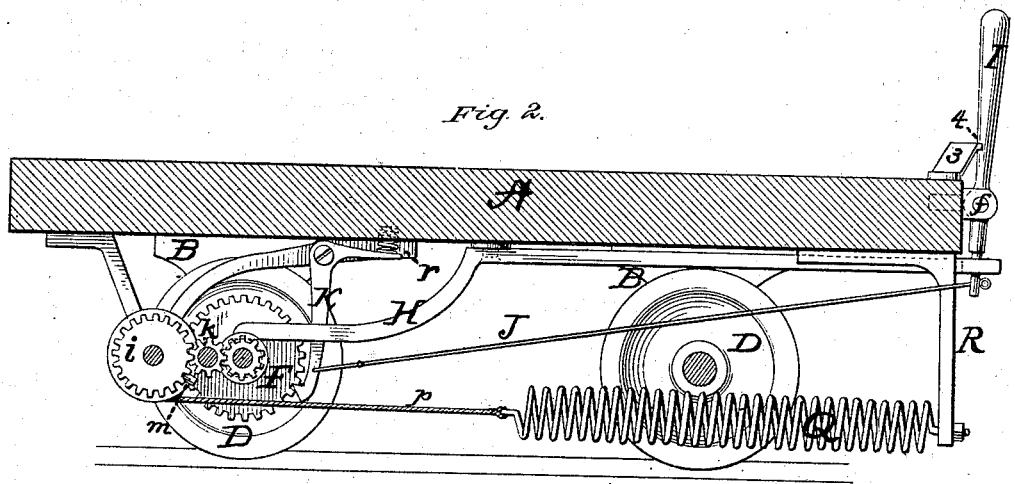

Figure 1 of the drawings is a representation of a bottom view of a street-car, showing our improvements attached thereto. Fig. 2 is a sectional view of the same through the line $x\,x$ of Fig. 1.

This invention relates to car brakes and starters of that class in which the momentum of the car, when the motion is arrested, is made to accumulate a force that will assist in starting a street-car from the dead-stop.

The chief object of this improvement is in stopping the street-car quickly and at the same time storing up the power used in stopping the car for the purpose of starting or assisting in starting it again.

The novelty consists in an operating mechanism of a peculiar construction for enabling the driver or other person standing on the front platform of the car to arrest the motion of the wheels and store up a force to aid the horses in starting the car into motion from a state of rest.

It also consists, in combination with a mechanism for winding up a cable upon a drum, of a locking device to prevent farther revolution of the wheels; and, finally, in the novel construction and arrangement of the parts, as will be hereinafter more fully set forth, and pointed out in the claims.

In the annexed drawings, forming a part of this specification, the letter A represents the frame-work, B the hangers or bearing-blocks, with usual slots for boxes, C C' the axles, and D D the track-wheels, of a street-car.

The letter E represents a pinion with side clutch, $b$, attached thereto, arranged on the axle C', which turns loosely thereon—that is to say, the axle revolves loosely therein in its unclutched condition—and F represents a large pinion or gear with a side clutch, $c$, fastened thereto, arranged on the same axle in a similar manner. These pinions are retained in position from moving lengthwise on the axle by means of the collars $d$, with set-screws, substantially as shown in Fig. 1 of the drawings.

A sliding double clutch, G, is feathered onto the axle C', between the clutches $b\,c$ of the pinions, so that by moving it in one direction it engages with the clutch and winds up a cable upon a drum, hereinafter described, and when moved in the other direction liberates the car from its locked position.

The shifting of the double clutch is caused by means of a lever, H, having its fulcrum on the under side of the bottom of the car, by means of a pivot or bolt, $d''$, as indicated in Fig. 1 of the drawings. The rear end of this shifting-lever is bent outwardly and downwardly, so that the reduced end thereof, provided with the flat spring $e$, will rest in the channel or grooveway formed in the double clutch. The upper or forward end of the lever is slotted, or otherwise formed, to receive the lower end of the vertical operating handle or lever I, swiveled in the block $f$, attached to the front platform.

The lower end of the vertical lever I (see Fig. 2) is provided with a connecting-rod, J, extending back to and connected with the pawl K, that engages with a ratchet-wheel, for the purpose of releasing the pawl from engagement with the ratchet-wheel.

In the drawings the pawl K is shown engaging with the gear F; but in practice a ratchet-wheel will ordinarily be secured to the side of the gear.

It will be observed that the vertical lever or handle I, in connection with the notched curved guard 3, serves a twofold purpose—to wit, means for moving the shifting-lever and means for releasing the pawl from engagement with the ratchet-wheel.

The letters L L' indicate brackets supporting a short shaft, M, arranged immediately in rear of shaft or axle C', and in the same horizontal plane, or substantially so. On this shaft is mounted, near each end, two pinions, $h$ $i$, but of different diameters, the smaller pinion $h$ meshing into the large gear F, the larger pinion meshing into a small pinion, $k$, journaled to the bracket L', and this small pinion $k$, now intermediately arranged, meshes into the pinion E on axle C', as shown in the drawings.

The pinion $i$ is provided on its periphery (see Fig. 2) with a pin, $m$, or equivalent device, for the purpose of allowing but one revolution of the pinion when it forms a locking or stopping device to arrest further motion of the car-wheels. If it should be found in practice to allow more than one revolution a stop mechanism could be arranged at the side of the pinion for that purpose.

Intermediately arranged between the pinions on the small shaft M is keyed or otherwise secured a drum, N, to which is attached in a suitable manner a wire cable, $p$, secured to the rear end of the coil-spring Q. This coil-spring, with its cable, is suspended from the under side of the car, either above or below the axle, by means of the bracket or arm R, substantially as shown in Fig. 2 of the drawings.

The pawl K is of an angular shape and is pivoted to the bracket L.

The toe portion of the pawl is kept in contact with the ratchet-wheel by means of the spring $r$, let into a recess in the bottom of the car and pressing upon the wheel portion thereof, substantially as indicated in Fig. 2 of the drawings.

The gearing of this brake and starter, in practical operation, will work up and down, to correspond with the play in the axle-bearings, and not get out of gear. The shifting-lever may be so made as to admit of this necessary up-and-down play, which may be accomplished by making a swivel on bearing where it is fastened to the car, or by having its forked portion reaching above and below the sliding clutch, leaving some play.

When the car is running ordinarily the vertical lever is in the notch 4 of the guard 3 and in an upright position. To stop the car, move this lever to the right, which causes the clutch, through the instrumentality of the shifting-lever, to be thrown into gear and the cable to be wound upon the drum, which draws out the coil-spring and brakes the wheel, thereby stopping the car; and to start or assist the horses to start the car in motion, throw the lever over to the left in the direction of the slot 5, but not in the slot, thus bringing the sliding clutch into gear with the clutch on the large pinion or gear, and when clutched the lever is thrown back into the slot 5, which causes the pawl to be raised or released from the ratchet-wheel, liberates the car, and allows the coil-spring to recede to its normal position, thereby moving the car forward, the gearing keeping the motion of the car-wheels always in the same direction—forward. The effect of changing the sliding clutch is to get this forward motion so as to make the spring available for the purpose stated.

We thus provide a means or a mechanism for enabling the driver not only to stop the car quickly, but at the same time, in the act of stopping, to store up a power to start, or assist the horses to start, the car again.

As the action of the spring is direct in starting the car it will be seen that the whole power stored up acts to rotate the axle forward with a leverage equal, at least, to the radius of the cable-drum.

One great strain upon street-car horses is starting loaded cars into motion from a state of rest. The means hereinbefore described are intended to obviate that by a transfer of power.

We have shown in the drawings but one coil-spring; but it is understood that others may be used, if found necessary, so that the conditions of strength and compressibility may be fulfilled; also, the mechanical construction of the parts may be varied to produce the same result.

This improvement may be applied to double-end cars that travel in opposite directions without turning around, and to cars of other classes.

Broadly considered, some of the features and combination of parts embodied in our improvements are old, and are not claimed by us. For instance, we do not broadly claim a clutch mechanism for engaging and disengaging the gearing constituting a part of the operating mechanism, nor a drum for winding up a cable attached indirectly to a compressible spring; nor do we broadly claim the combination of meshed gearing, a winding-up drum, compressible spiral springs, a cable, a clutch mechanism, and a shifting-lever; but

What we claim as our invention, and desire to secure by Letters Patent, is—

1. A mechanism for stopping and starting cars, which consists of the meshed gearing E $i$ F $h$, clutch devices G $b$ $c$, winding-up drum N, tension coil-spring Q, with cable $p$, shifting-lever H, pawl K, connecting-rod $b$, and operating-lever I, substantially as shown and described.

2. In a means for stopping a street-car, a meshed pinion or gear carrying a stopping device, m, or its equivalent, to permit one or more revolutions of the pinion, whereby the motion of the car is materially arrested, as hereinbefore stated.

3. The combination, with a mechanism for stopping a street-car, and said mechanism being provided with a winding-up drum, of the tension coil-spring Q, and the cable p, attached directly to its rear end, as described.

4. The combination, with means for storing up power to start a car, of the pawl K, connecting-rod J, and operating-lever I, substantially as set forth.

In testimony whereof we have hereunto subscribed our names.

CHARLES W. RICHARDSON.
EDMUND DAWSON.
JOHN E. DAWSON.

Witnesses:
N. P. CHIPMAN,
CHAS. A. GARTER.